United States Patent [19]

D'Ortenzio

[11] 4,153,817
[45] May 8, 1979

[54] DIGITAL CONFERENCE CIRCUIT
[75] Inventor: Remo J. D'Ortenzio, Rochester, N.Y.
[73] Assignee: Stromberg-Carlson Corporation, Tampa, Fla.
[21] Appl. No.: 855,075
[22] Filed: Nov. 25, 1977
[51] Int. Cl.² .............................................. H04M 3/56
[52] U.S. Cl. ................................................. 179/18 BC
[58] Field of Search ...................................... 179/18 BC
[56] References Cited
U.S. PATENT DOCUMENTS
3,882,276  5/1975  Feiner et al. ................ 179/18 BC X Primary Examiner—William C. Cooper
Attorney, Agent, or Firm—Michael F. Oglo; Donald R. Antonelli

[57] ABSTRACT

A digital conference circuit provides greater stability in voice transmission by selectively inverting the signal in alternate conference channels, thereby providing cancellation of parasitic echo signals which tend to create oscillations or ringing. Selective gain control is also provided for conferences of different sizes and efficient use of conference lines is ensured by providing for selective combination of conference groups.

35 Claims, 19 Drawing Figures

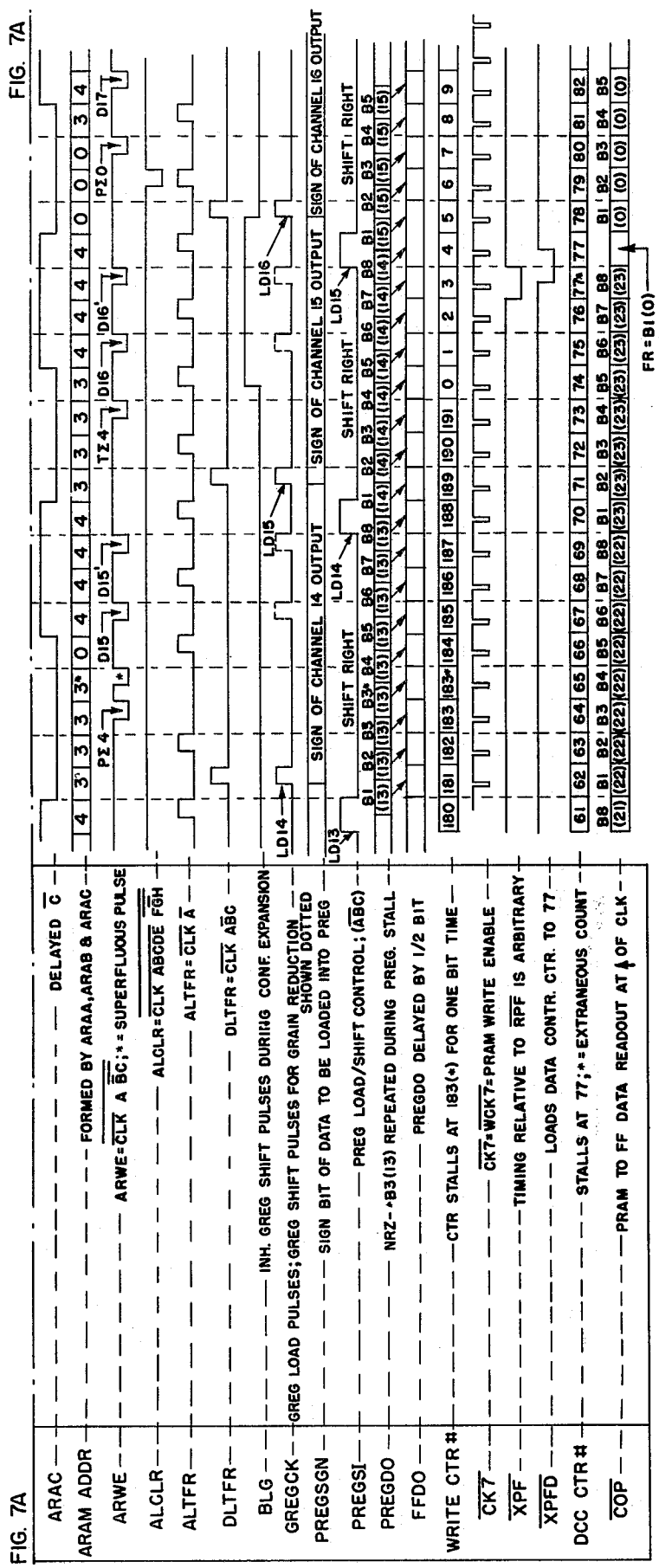

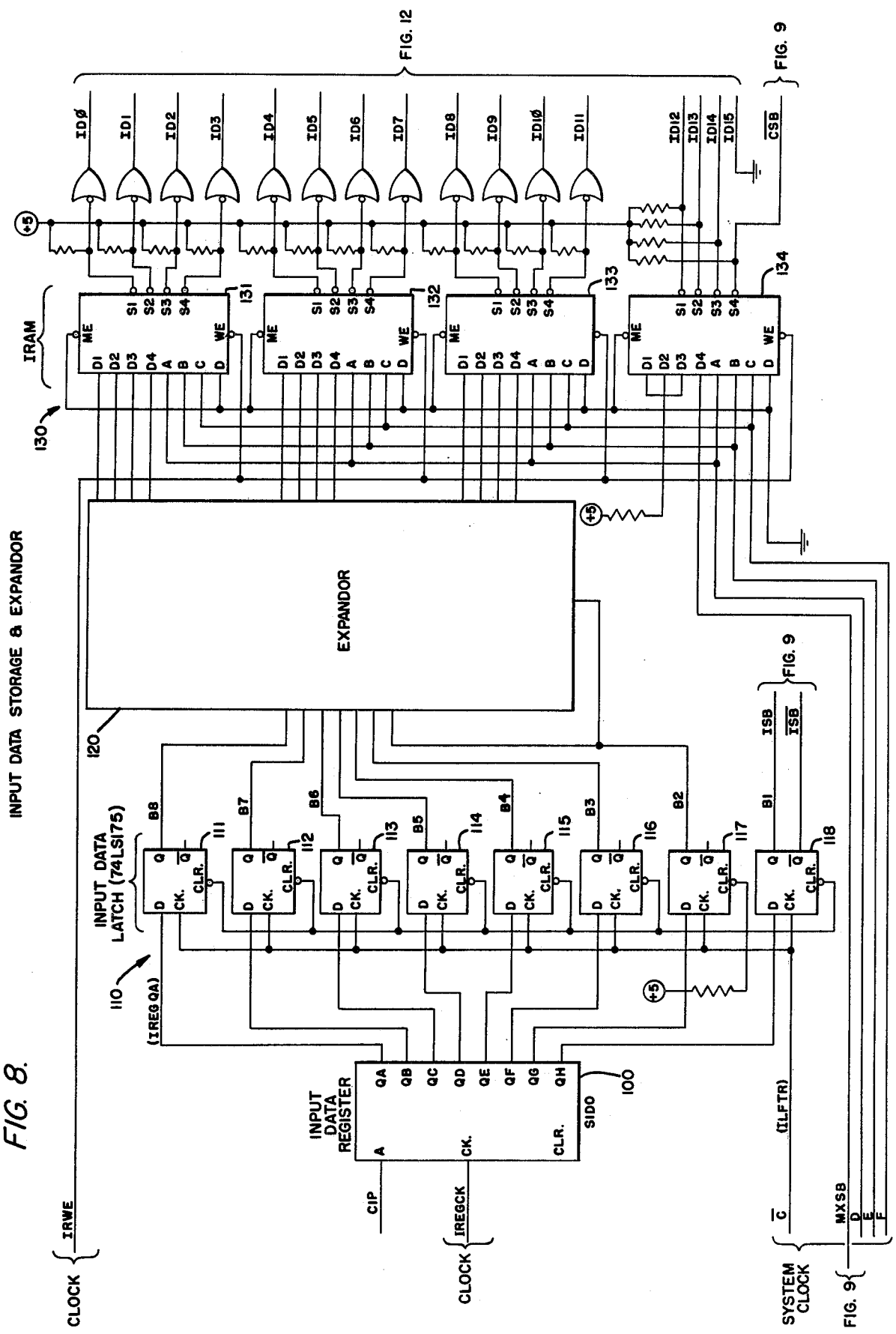

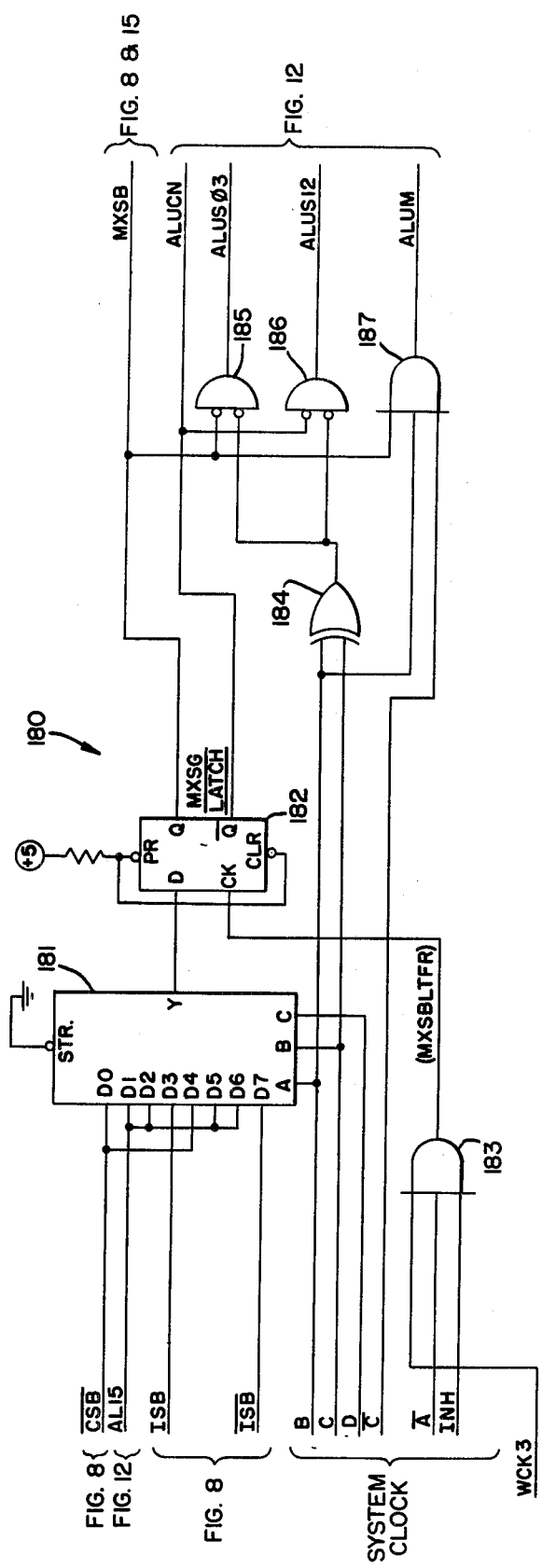

FIG. 11.

| WORD NUMBER | IRAM MEMORY LOCATION |
|---|---|
| #0 { 0 | 0 |
| 1 | 1 |
| 2 | 2 |
| 3 | 3 |
| #1 { 4 | 4 |
| 5 | 5 |
| 6 | 6 |
| 7 | 7 |
| #2 { 8 | 0 |
| 9 | 1 |
| 10 | 2 |
| 11 | 3 |
| #3 { 12 | 4 |
| 13 | 5 |
| 14 | 6 |
| 15 | 7 |
| #4 { 16 | 0 |
| 17 | 1 |
| 18 | 2 |
| 19 | 3 |
| 20 | 4 |
| 21 | 5 |
| 22 | 6 |
| 23 | 7 |

FIG. 16.

| TRUTH TABLE SHOWING NUMBER OF GAIN CONTROL PULSES (GCPUL) PER CHANNEL, FOR EACH POSSIBLE CONFERENCE CONFIGURATION: | | | | |
|---|---|---|---|---|
| BASIC CONF. SIZE | GCTRL STATE | C( )EX STATE | IBLG | NUMBER OF GCTRL PULSES (GCPUL) |
| 4 PARTY (C INPUT TO GCPUL MUX=0) | 0<br>0<br>0<br>0 | 0<br>0<br>1<br>1 | 0<br>1<br>0<br>1 | (1)<br>(0)<br>(2)<br>(0) |
|  | 1<br>1<br>1<br>1 | 0<br>0<br>1<br>1 | 0<br>1<br>0<br>1 | (0)<br>(0)<br>(1)<br>(0) |
| 8 PARTY (C INPUT TO GCPUL MUX=1) | 0<br>0<br>0<br>0 | 0<br>0<br>1<br>1 | 0<br>1<br>0<br>1 | (2)<br>(0)<br>(2)<br>(0) |
|  | 1<br>1<br>1<br>1 | 0<br>0<br>1<br>1 | 0<br>1<br>0<br>1 | (1)<br>(0)<br>(1)<br>(0) |

C    A    B

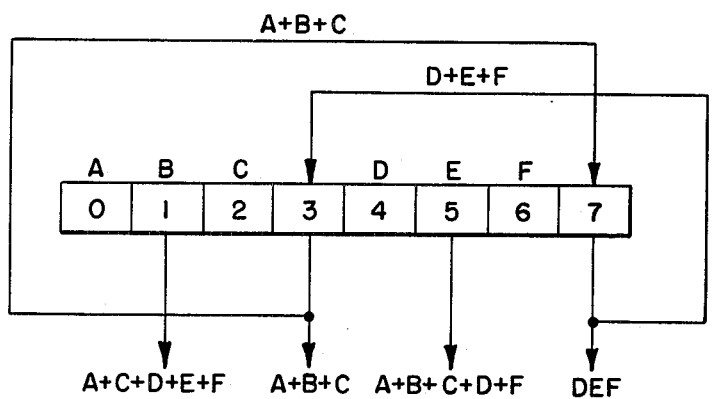

FIG. 18.

DIGITAL CONFERENCE CIRCUIT

The present invention relates in general to telephone systems, and more particularly, to a digital conference circuit for use in a time division multiplex digital switching PABX system.

With the rapid progress in digital integrated circuit development and the continued pattern of declining costs of integrated circuits, more and more switching systems are being designed utilizing time division multiplexing techniques, particularly in PABX systems. One of the most difficult problems involved in the design of digital PABX system relates to the provision of reliable, cost-effective conference circuits of moderate size, ranging from approximately three to ten parties, which is typically encountered in the standard system. Of the considerations encountered in such design, the most difficult relates to the problem of stability, especially in the most common situation where the lines and trunks which connect to the PABX are standard two-wire analog telephhone lines.

In order to perform time-division multiplex digital switching, it is necessary to first split the incoming bi-directional (two-wire) analog signals into separate transmit and receive paths (two wires each). This is accomplished by means of a telephone hybrid network which consists of a set of transformers and a balance network for providing a matching impedance to the impedance seen looking into the two-wire analog line. While ideal design requires that the matching impedance be perfectly matched to the line impedance, in practice, such a condition cannot be realistically achieved. Thus, a certain mis-match occurs which adversely affects the stability of the system by permitting a coupling of the signals across the hydrid, which signals are then permitted to loop around and thereby inject an echo or reflection signal into the line. As in any feedback control system, if the gain around the loop is high enough, and certain phase conditions are present, this echo or reflection signal can sustain itself, and a "singing" or oscillation results.

Even when the gain around the loop is low enough to prevent singing or oscillation, there are cases where the system can approach instability and the voice signals under such conditions will sound very hollow. This problem is a difficult one even in connection with a standard two-party connection; however, when the problem is applied to conference networks, it becomes multiply serious. The major difference, from the standpoint of stability, in a conference network is that every transmitted voice signal in the conference has as many potential "reflectors" (hybrids) which can cause a receive signal to be reinjected back into the network as there are parties to the conference. Thus, if the transmission loss between parties is to be held constant, increasing the conference size results in more "reflections" and hence poorer stability.

A further problem in the deisgn of conference circuits is to provide for different conference combinations ranging in size from three to ten parties while making the most efficient use of the various lines available to the conference circuit. For example, while a ten-party conference may not be a common requirement of the telephone system, it may be desirable to include the facilities for a conference of this size in the system. If a conference circuit were provided which dedicated ten lines to the establishment of such a ten-party conference, such an arrangement would be most inefficient since such lines would be used very little. In addition, such allocation of ten of the available conference lines to a rarely-used conference circuit leaves very few additional lines to perform the main bulk of the conference operation.

A further problem which arises in conference facilities relates to the need to power the gain of the larger conference circuits so as to ensure stability and hence good transmission quality to all parties in the conference connection. In a conference system where conference circuits are designed to accommodate different numbers of parties, the required gain (to ensure stability) for the respective conference circuits will vary depending upon the size of the conference. In a time-division multiplex digital conference circuit, some provision must therefore be made to monitor the size of the conference being established and adjust the gain commensurate therewith.

The aforementioned problems are solved in accordance with the present invention in a system in which the stability of the system is greatly improved without resorting to unacceptable low transmission levels by inverting the signal in one half of the conference channels, thereby causing some reflected signals to cancel each other rather than reinforce them. This is particularly effective in the case where the lines are all short and all reflected signals would otherwise tend to be in phase. This can be accomplished by introducing an inverting amplifier in every other one of the conference channels of the system. The same type of phase cancellation to eliminate reflected signals is achieved in the subject invention by merely inverting the sign bit associated with the data in every other received conference channel.

In providing a conference system which most efficiently utilizes the available conference lines in providing a range of conference of sizes between three and ten parties, the present invention combines the available lines into groups of reasonable size which may be expanded by combining groups to form conferences of larger or intermediate size. For example, by providing conference circuits having four and eight-party capabilities, various combinations of these circuits can be effected to produce six and ten-party conferences by merely joining groups of conference circuits in the same conference connection. In this way, smaller size conference circuits which may be more practical from the demands of the system are provided while also making possible less frequent conferences of larger size.

In providing proper gain control for the respective conference circuits of different size, the system provides a timing and control arrangement which automatically provides for gain reduction at times when conferences of larger size are being processed including the larger conference groups and the standard size groups which are being used to form an expanded conference facility. In addition, for those channels of each conference circuit which are required in the linking of conference circuits during expanded conference operations, which channels are merely cross-linked within the system during such expanded operation, the gain control circuitry automatically adjusts during processing of such channels to inhibit gain control.

It is therefore a general object of the present invention to provide an improved conference facility for use in connection with a time-division multiplex digital switching system.

It is a further object of the present invention to provide a conference system of the type described in which the stability of the system is improved without resorting to unacceptable low transmission levels.

It is a further object of the present invention to provide a conference facility of the type described in which most efficient use is made of the respective conference lines provided within the system from the point of view of achieving a fuller range of conference sizes without unnecessarily dedicating large numbers of conference lines to little-used facilities.

It is still another object of the present invention to provide a conference facility of the type described in which the gain within the system for conferences of different size is automatically adjusted.

These and other objects, features, and advantages of the present invention will become more apparent from the following detailed description of the present invention, when taken in conjunction with the accompanying drawings wherein.

Figures 7A, 7B:
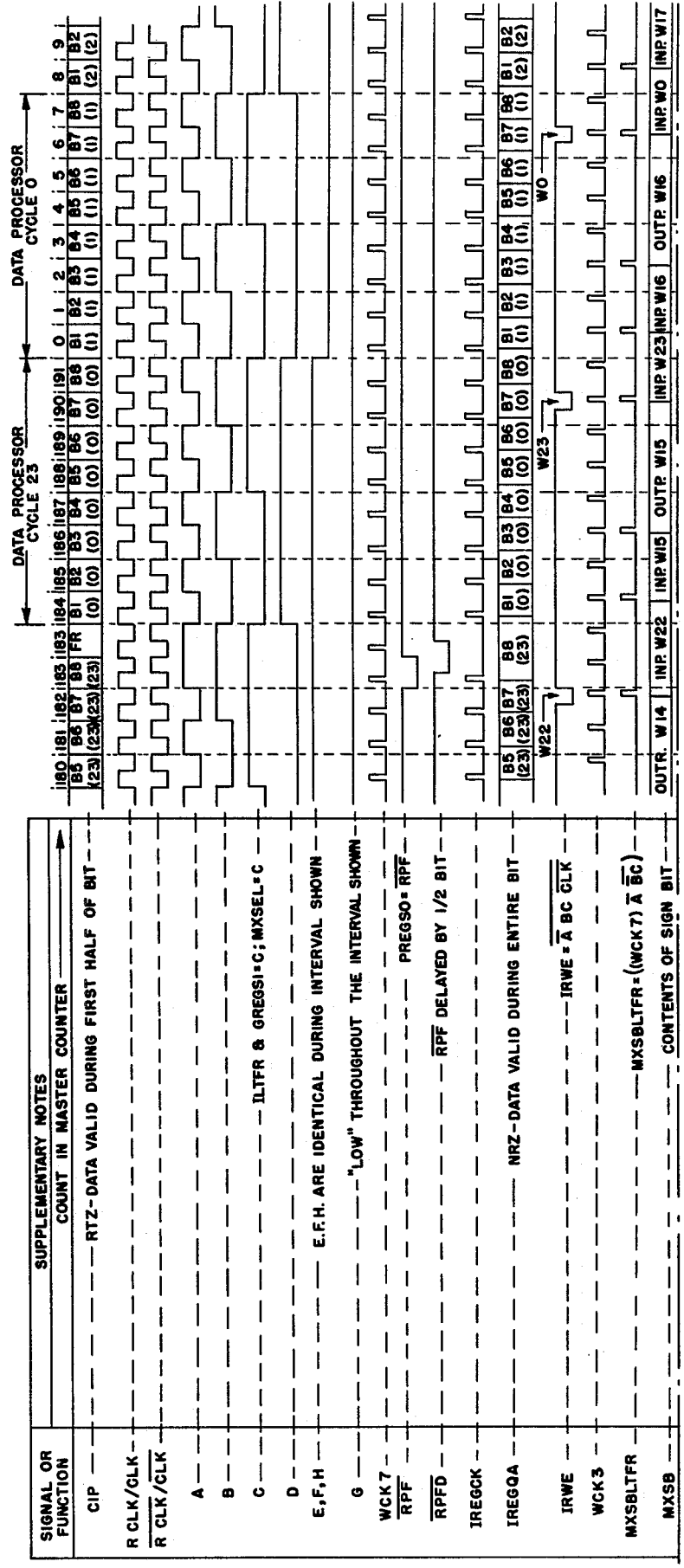
Figure 12:
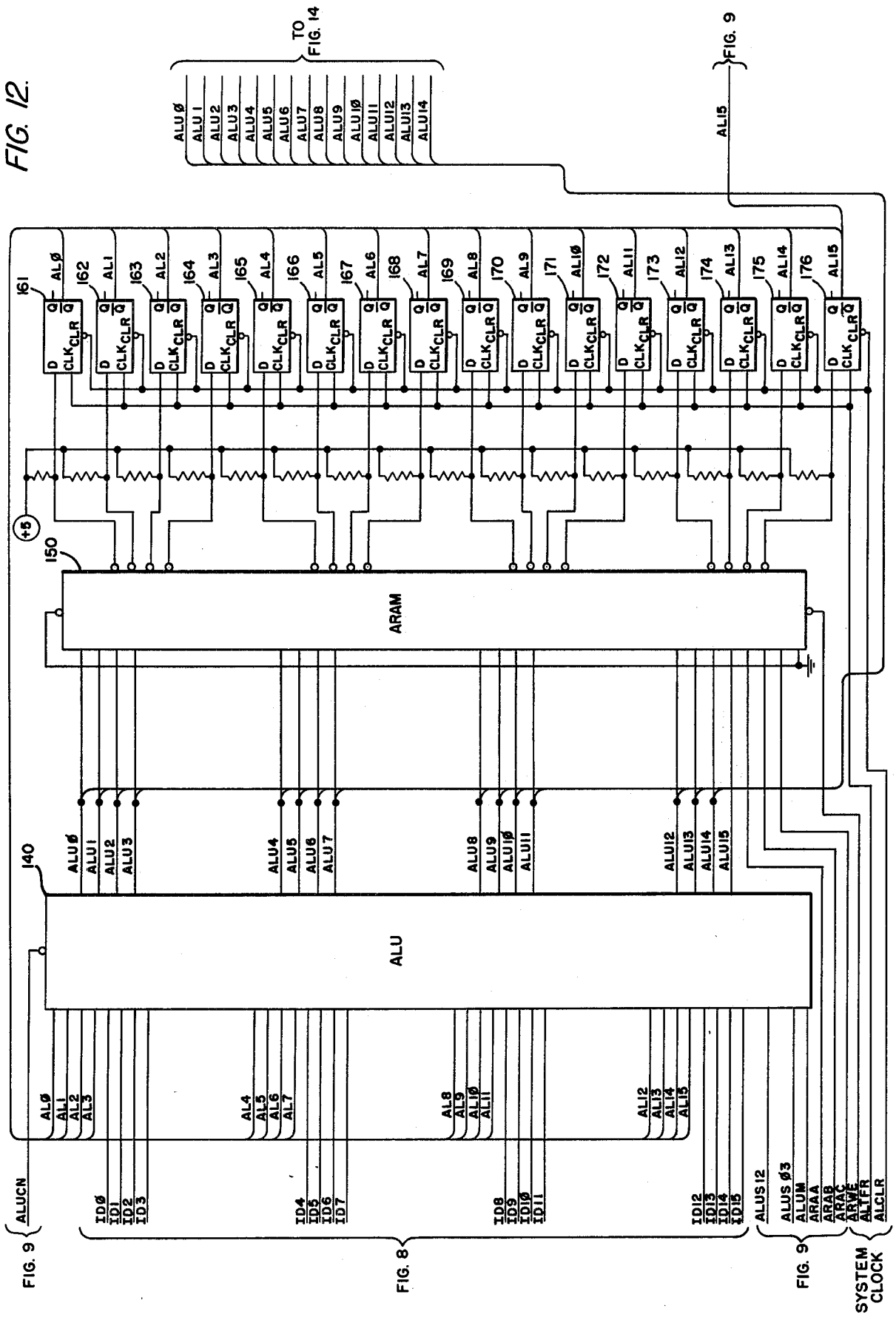
Figure 13:
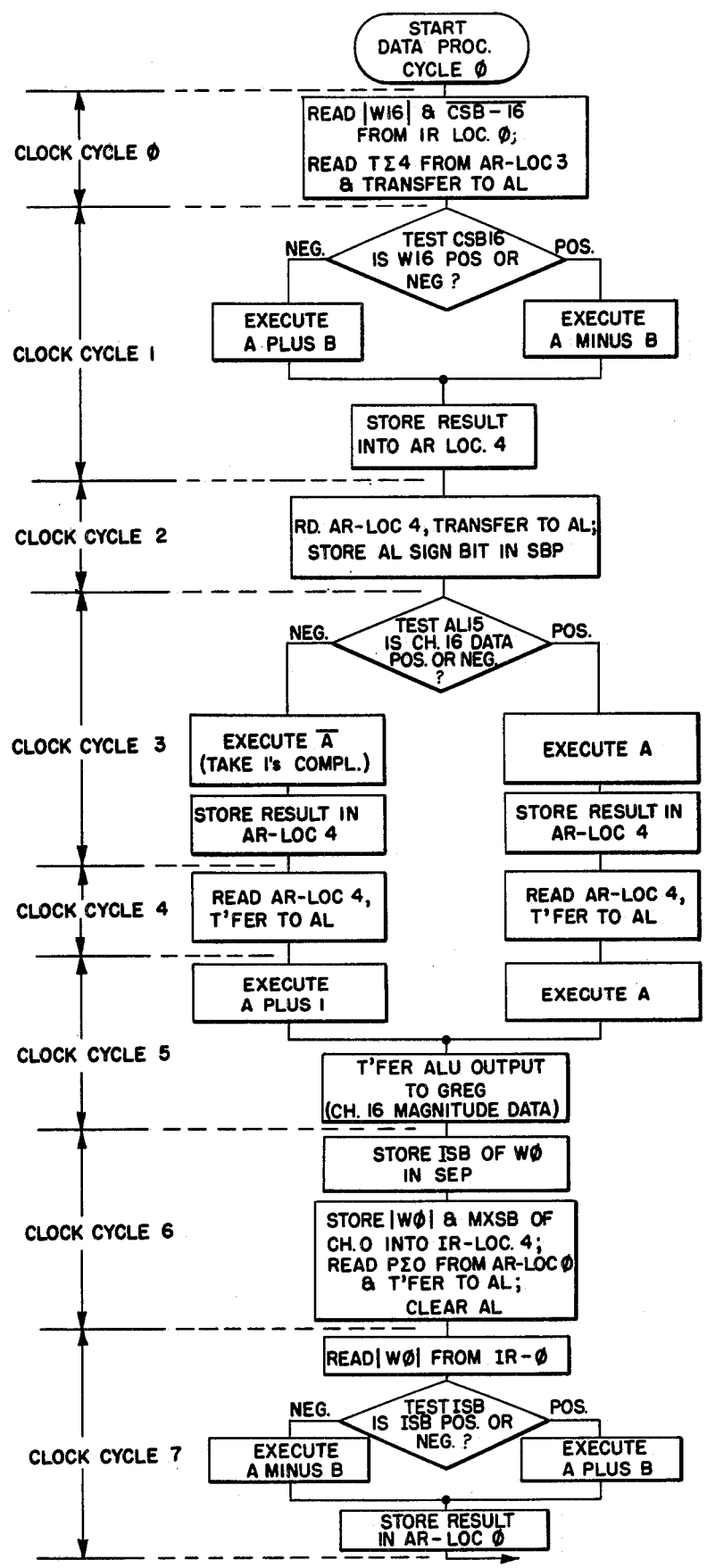
Figure 14:
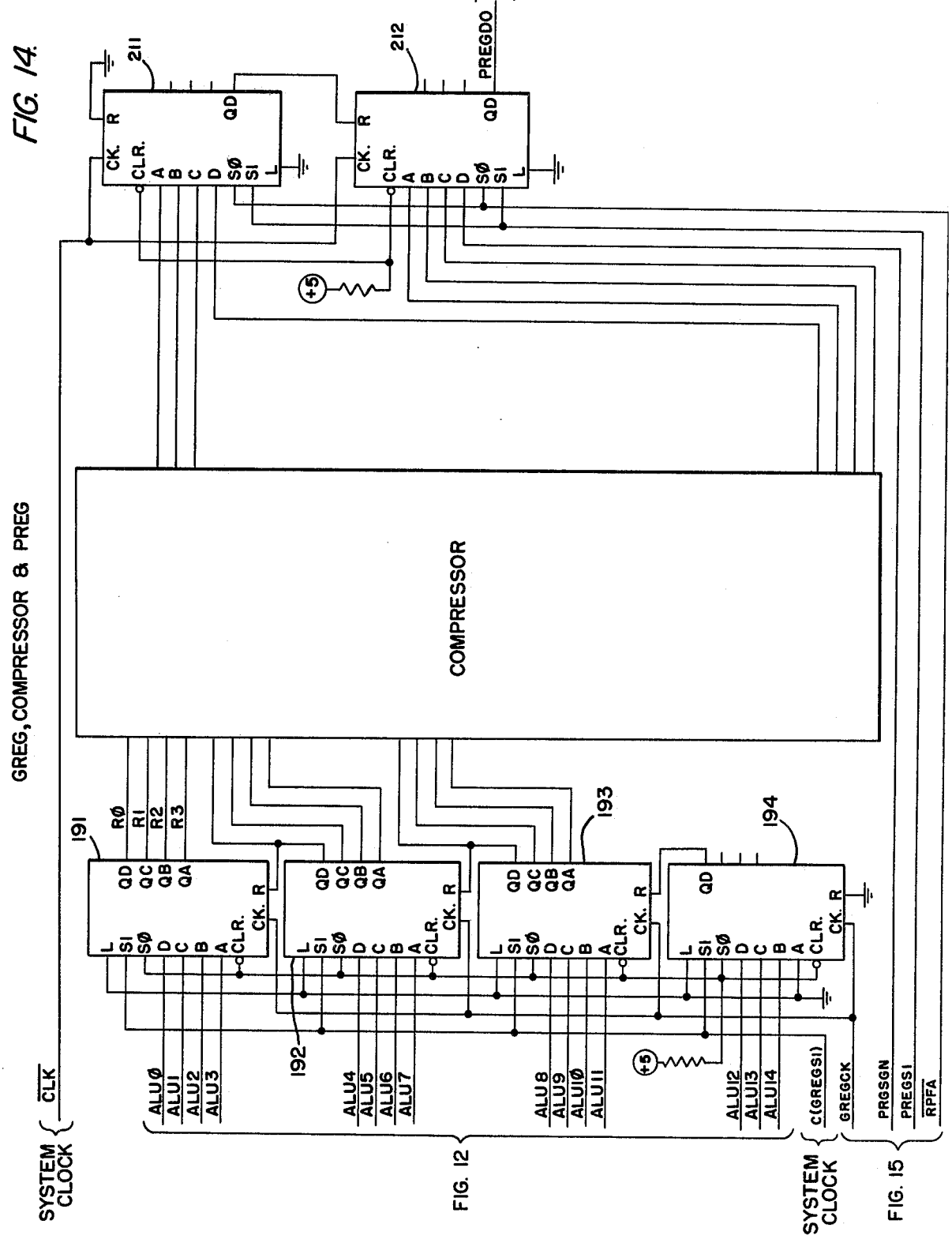
Figure 15:
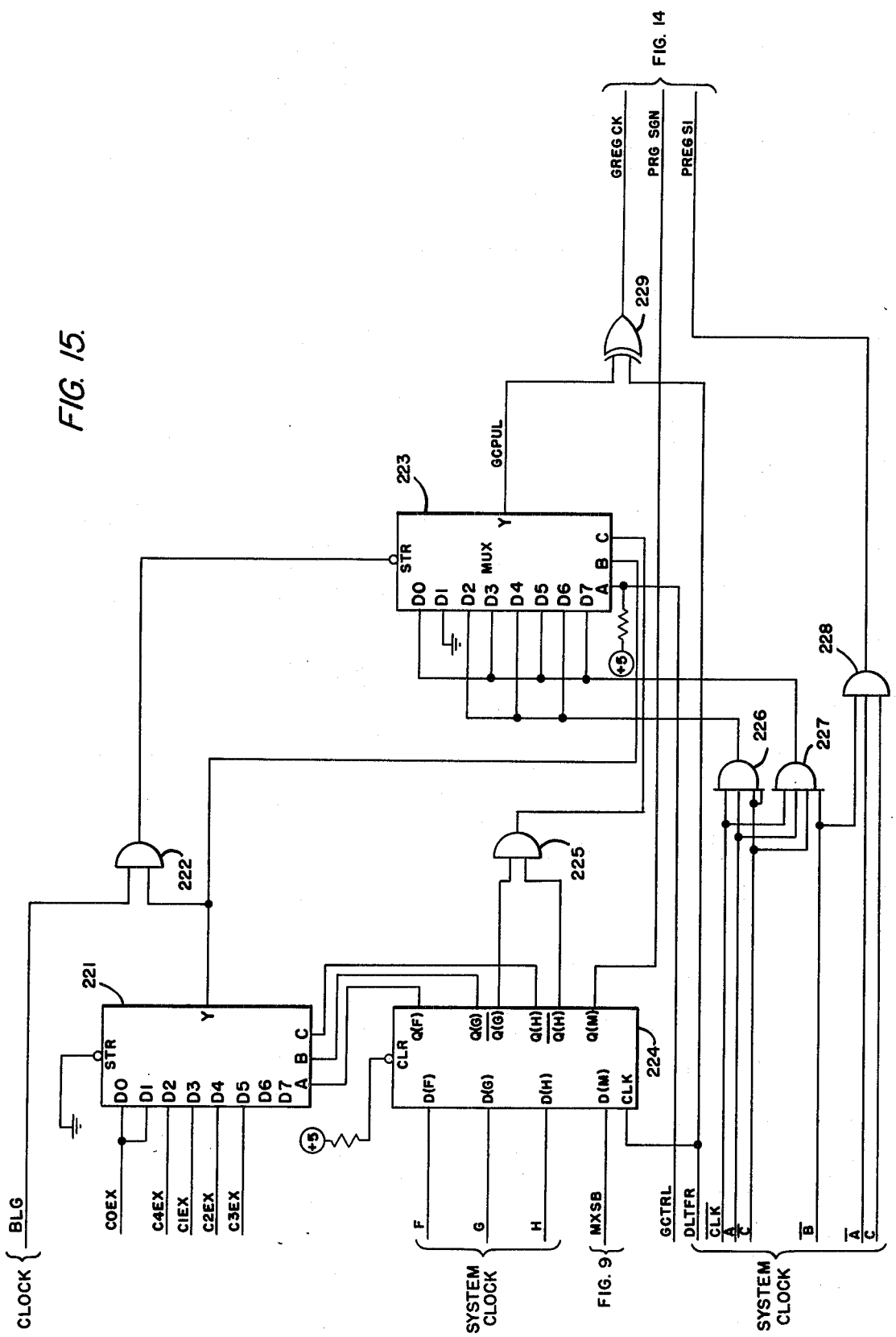
Figure 17:
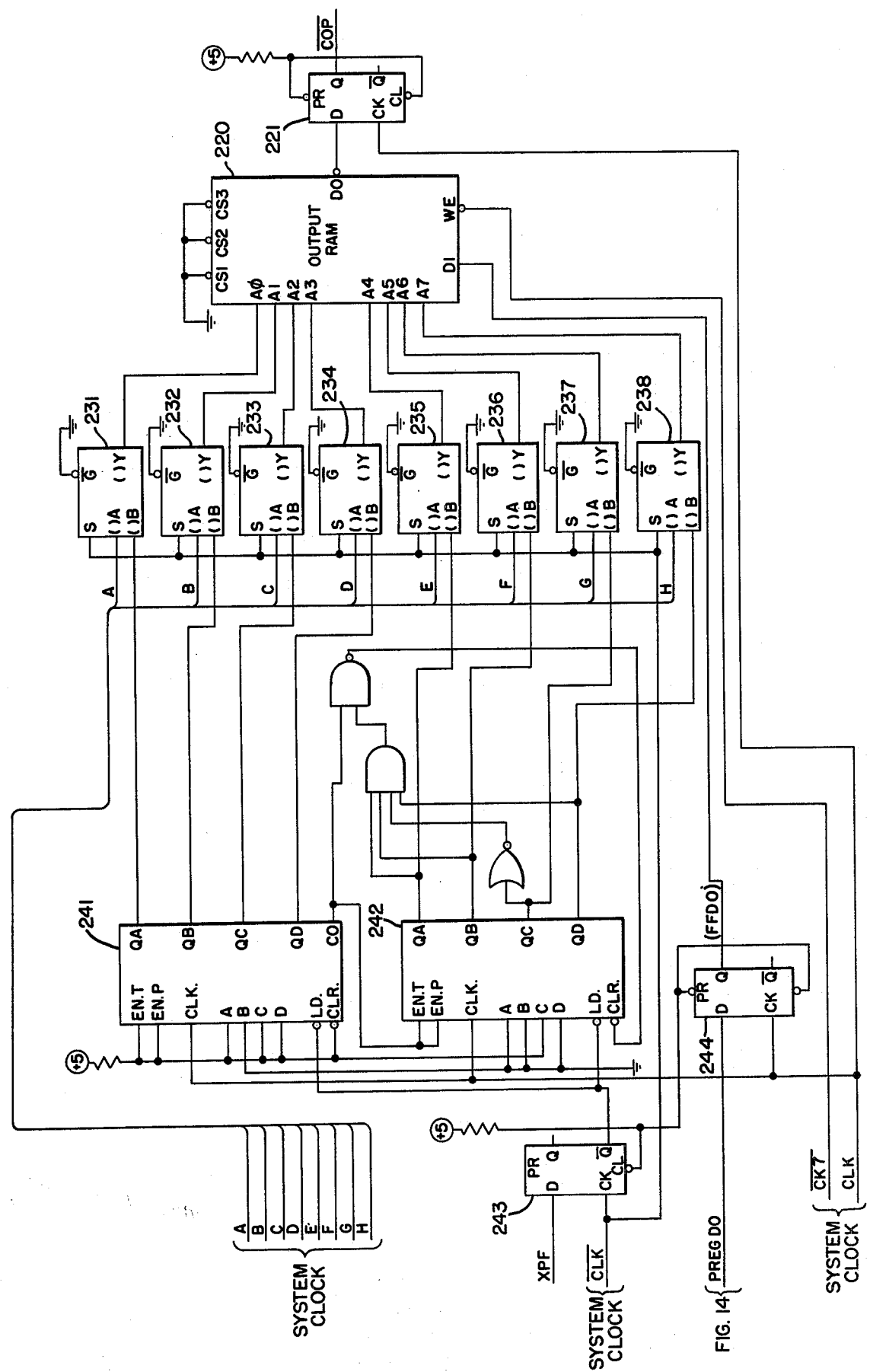

FIG. 7A and 7B provide a waveform diagram illustrating the various waveforms of the signals in the digital conference circuit;

FIG. 8 is a schematic circuit diagram of the input data register, input data latch, expander, and input RAM;

FIG. 9 is a schematic circuit diagram of the sign bit processor;

FIG. 10 is a logic truth table relating to the operation of the sign bit processor;

FIG. 11 is a table indicating the memory locations for storage of the conference channels in the input RAM;

FIG. 12 is a schematic circuit diagram of the arithmetic logic unit, ALU RAM, and ALU latch;

FIG. 13 is a flow diagram describing the operation of arithmetic processing portion of the digital conference circuit;

FIG. 14 is a schematic circuit diagram of the gain control register, compandor, and parallel shift register;

FIG. 15 is a schematic circuit diagram of the gain control processor;

FIG. 16 is a truth table explaining the operation of the gain control processor;

FIG. 17 is a schematic circuit diagram of the data control counter, multiplexer and output RAM; and FIG. 18 is a schematic diagram illustrating the manner in which conference groups are combined.

The design of any conference facility naturally depends to an extent on the type of time-division multiplex switching system with which it must operate. In designing a digital switching system, there are a number of system parameters which must be considered before choosing an overall configuration; however, from the point of view of basic conference concepts, these design considerations of the digital switching system are relatively unimportant. Thus, in order to provide a more simplified understanding of the principles of the conference circuit in accordance with the present invention, a specific digital switching system of the type described in U.S. application Ser. No. 885,181, filed Nov. 25, 1977, by Klaus Gueldenpfennig et al, and assigned to the same assignee as the present invention, will be described herein only to an extent necessary to provide an understanding of one possible operating environment of the present invention. In this regard, however, it should be noted that the present invention is not limited to use with such a system, but has general application to time-division multiplex digital switching systems in general, as will become more apparent as this description proceeds.

Figure 1:
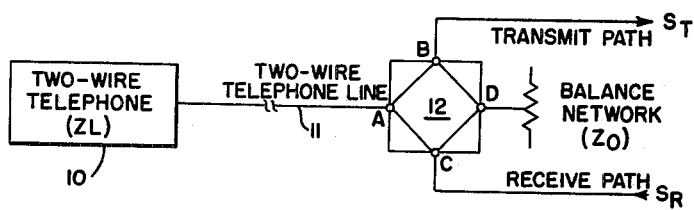
FIG. 1 is a schematic diagram of a typical telephone circuit of hybrid connection.

The problem of stability in a conference system will be described in more detail in connection with FIGS. 1–3. FIG. 1 shows a typical two-wire telephone 10 which is connected via a two-wire telephone line 11 through a line circuit or a trunk circuit containing a hybrid network 12, which conventionally consists of a set of transformers and a balance network in which the impedance $Z_L$ looking into the telephone line 11 from the hybrid 12 is balanced by a terminating impedance $Z_0$. Such an arrangement is designed to split the bi-directional analog signals on the telephone line 11 into a separate transmit path $S_T$ and receive path $S_R$.

Figure 2:
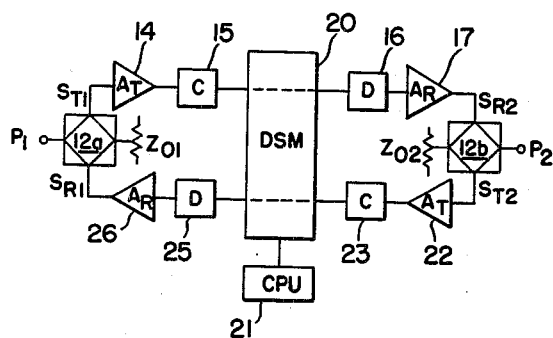
FIG. 2 is a schematic block diagram of a two-party connection through a digital switching network.

FIG. 2 illustrates the equivalent circuit connection of two parties using a hybrid circuit arrangement of the type shown in FIG. 1. In the two-party arrangement, a party P1 is connected through a hybrid 12a associated with a matching impedance $Z_{01}$ through a digital switching matrix 20, controlled by a central processing unit 21 to a party P2 connected to hybrid 12b, associated with matching impedance $Z_{02}$. The transmit line $S_{T1}$ from the hybrid 12a is applied through transmit amplifier 14, coder 15, the digital switching matrix 20, decoder 16, and receive amplifier 17, to the receive line $S_{R2}$ of the hybrid 12b. On the other hand, the transmit line $S_{T2}$ of the hybrid 12b is connected through transmit amplifier 22, coder 23, digital switching matrix 20, decoder 25 and receive amplifier 26 connected to the receive line $S_{R1}$ of the hybrid 12a. The transmit and receive paths associated with a particular subscriber, comprise a subscriber couplet of a transmit path and a receive path. For example, with regard to subscriber P1, the transmit path consists of transmit line $S_{T1}$, transmit amplifier 14, and coder 15. The receive path consists of decoder 25, receive amplifier 17, and receive line $S_{R1}$. Together, the transmit path and the receive path comprise a couplet of a transmit path and a receive path for subscriber P1.

A basic stability problem exists even with the simple two-party configuration illustrated in FIG. 2, because the balancing impedances $Z_{01}$ and $Z_{02}$ of each hybrid 12a and 12b cannot be perfectly matched to the line impedance $Z_L$ looking back into the two-wire line from the respective hybrid. The effects of this mis-match on stability can be seen from the following example. Assume during a given interval that party P1 is the speaker and party P2 is the listener. Under the ideal conditions where $Z_{02}$ is equal to $Z_{L2}$, one half of the signal on line $S_{R2}$ would be dissipated in the impedance $Z_{02}$ and the other half would be passed into the two-wire analog line and be received by the party P2. Under these conditions, none of the signal would couple across the hybrid to the transmit line $S_{T2}$. However, neither $Z_{01}$ nor $Z_{02}$ can be perfectly matched to the respective impedance $Z_{L1}$ and $Z_{L2}$ because of the variations in the line impedances and types of terminations that can be encountered.

For the condition where the matching impedance is not equal to the line impedance, a certain portion of the signal on the receive line $S_{R2}$ will couple across the hybrid $12b$ to the transmit line $S_{T2}$ and thus inject an echo or reflection into the transmit path of the listener's hybrid. If the gain around the loop is sufficient and of proper phase, an echo will be creased which can sustain itself and produce a singing or oscillation in the loop.

In a hybrid network of the type described, the relationship which defines the amplitude and phase of the component on the line $S_R$ which is coupled across to the line $S_T$ is given by:

$$S_T/S_R = (Z_L - Z_0)/(Z_L + Z_0) \quad (1)$$

For a given set of matching and characteristic line impedances, the stability of the overall loop in a two-party connection would be a function of the gains and phases of the elements in the transmit and receive paths. Since phase control is generally not practical, an obvious trade-off exists between transmission gain and stability. For any given system, the values of matching impedance are fixed by components included in the various line and trunk circuits, but the values of the characteristic impedance of the line that can be encountered can vary over broad limits. Hence, the problem of how much gain can be provided without risking singing is a statistical one. Oftentimes it is assumed that the shortened line condition and open line condition represent the "worst case" line impedances that are encountered, and the gain functions are selected based on these values. Unfortunately, it has been found both theoretically and experimentally that some types of inductive terminations are even worse than the open and short circuit conditions.

The stability problem associated with a two-party connection is multiplied in a conference connection. FIG. 3 provides an example of a four-party conference in which a simple linear summation of the conferees voice signals is provided. Similar reference numerals are utilized in FIG. 3 to designate corresponding elements in FIG. 2 wherever possible; however, rather than interconnect two parties, the digital switching matrix 20 under control of the central processing unit 21 responds to the conference request by connecting the four designated parties through the digital switching matrix 20 to a conference processor 28. Thus, the transmit line $S_T$ of each of the hybrids $12a-12d$ is connected through a respective decoder 30-33 in the conference processor 28 to a summing circuit 40 where the contributions of each of the conferees is summed. The output of the summing circuit 40 is applied to one input of a respective differential amplifier 41-44, the other inputs of these amplifiers receiving the individual contributions of the respective conferees. The outputs of the amplifiers 41-44 are applied through respective coding circuits 34-37 to the receive lines $S_R$ of each of the respective hybrids $12a-12d$.

Figure 3:
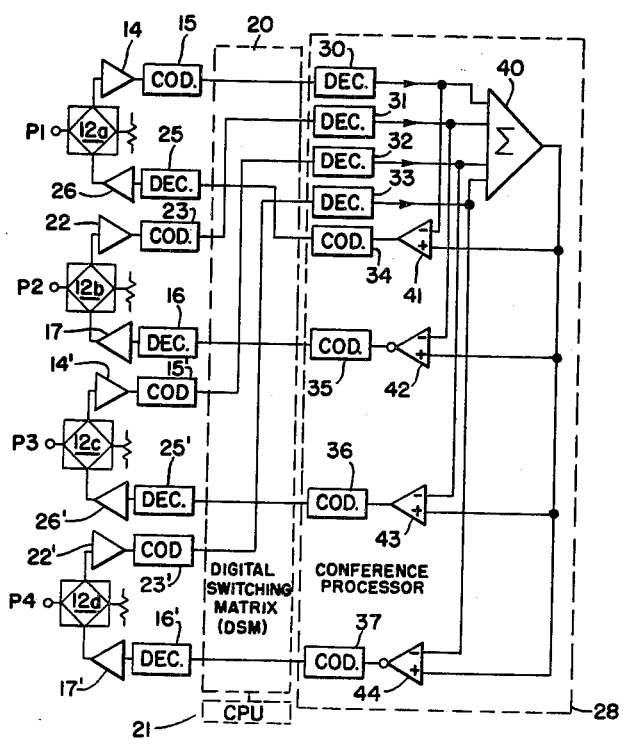
FIG. 3 is a schematic block diagram of a four-party conference system.

In the system of FIG. 3, since the impedance mis-matches in the hybrids are the primary contributors to instability, the effect of the respective coders and decoders in the system can be ignored for the purpose of considering the basic stability concept. It is also noted that after summing of the four voice signals from the respective conferees in the summing circuit 40, each party's individual voice contribution is subtracted out in the differential amplifiers 41-44 before the summed voice signal is returned to the individual party's receiver. This minimizes echo effects and improves the overall system stability.

As is apparent, FIG. 3 actually depicts simply a more complex version of the two-party circuit shown in FIG. 2; however, the major difference between the two systems, from the standpoint of stability, is that every transmitted voice signal in the four-party conference has four potential "reflectors" in the form of hybrids which can cause a received signal to be reinjected back into the network. Thus, if the transmission loss between parties is to be held constant, increasing the conference size results in more "reflections", and hence poorer stability.

The instability considerations attendant to a conference facility can be quantitatively summarized for an N party conference with participants P1, P2, . . . PN interconnected by an enlarged version of the circuit of FIG. 3. Using equation (1), and applying superposition, the summation S of the reflected signals caused by a voice signal V transmitted from any party P, is given by:

$$S = KV \sum_{i=1}^{N} \frac{Z_{Li} - Z_{0i}}{Z_{Li} Z_{0i}} \quad (2)$$

where K=system gain constant; $Z_{Li}$=line impedance of hybrid i; $Z_{0i}$=terminating impedance of hybrid i.

If we assume that the $Z_0$ values are fixed by design and the values by $Z_L$ are random, then the phase angles and amplitudes of the reflected signals from each hybrid form a set of random vectors and their summation which is represented by equation (2) will have some type of probability distribution which would be very difficult to define for any given PABX installation. The larger the value of S, the poorer the stability of the conference network. The worst possible case would result if the phases of reflected signals at each hybrid tended to be approximately equal and the signal thus tended to linearly add.

Unfortunately, this "worst case" is often encountered in practice, particularly in small PABX installations. If we assume that the reactive components of $Z_L$ and $Z_0$ are relatively small, it then follows from equation (1) that the reflected signal at each hybrid is either in phase or 180° out of phase with the received input. Furthermore, if all lines in the PABX are relatively short, the impedance $Z_L$ tends to be less than the impendance $Z_0$ and all reflected signals are 180° out of phase with their received inputs and tend to reinforce each other.

In accordance with the present invention, the stability of the conference circuit can be improved without sacrificing transmission quality simply by introducing an inverting amplifier in one-half of the channels of the conference processor 28, thereby causing some reflected signals to cancel others, rather than reinforce them. This is particularly effective in the case where all lines are short and all reflected signals would otherwise tend to be in phase. In FIG. 3, the inverters are provided in the form of inverting differential amplifiers 42 and 44.

The same effect as provided by inverting amplifiers in alternate channels of the conference processor can be accomplished by merely inverting the sign bits in the signals of every other channel received in the conference circuit. Such control over the processing of the conference channels is provided in accordance with the present invention, and will be described more particularly hereinafter in connection with the preferred embodiment.

Figure 4:
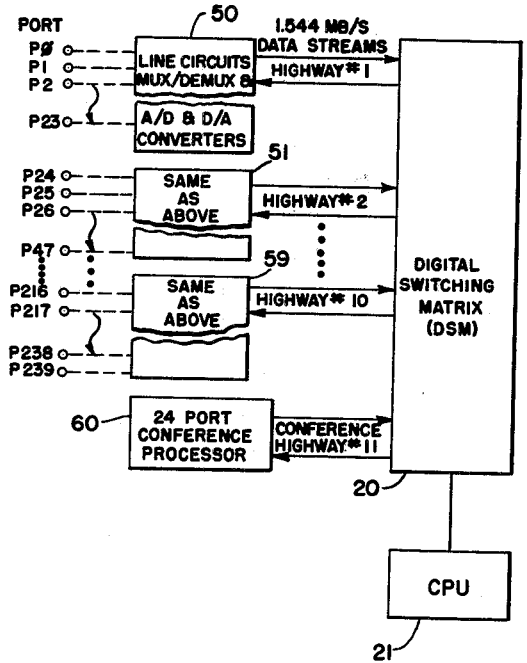
FIG. 4 is a simplified block diagram of a PABX including a conference processor.

FIG. 4 is a simplified block diagram of a typical 240 port TDM digital PABX switching system of the type described in the aforementioned copending application Ser. No. 884,181 of Klaus Gueldenpfennig et al. The system includes a plurality of pulse code modulation port groups 50–59, each port group being associated with a plurality of ports, which may consist of line circuit, trunk circuits, operator line keys, etc. With each of the port groups 50–59, there is provided a pulse code modulation circuit serving to convert voice signals to an 8-bit PCM signal and also to multiplex signals received from the ports associated therewith for transmission on a respective multiplex highway H1–H10 as serial data to the digital switching matrix 20 under control of the central processing unit 21. Multiplex data in serial form received in the multiplex highway from the digital switching matrix 20 is also converted from 8-bit PCM to voice frequency, demultiplexed, and applied to the appropriate port by the pulse code modulation circuit within each port group. The multiplex highway going from a port group to a switch matrix sequentially communicates a plurality of serial time division multiplexed PCM words. Likewise, the multiplex highway from the switch matrix to the port group provides corresponding communication of PCM words in the other direction. Each PCM word multiplexed from the port group to the switch matrix comprises a transmit path sequential channel, and each PCM word multiplexed from the switch matrix to the port group comprises a receive path sequential channel. The transmit sequential channel and the receive sequential channel associated with a particular subscriber constitute a subscriber couplet of transmit and receive sequential channels.

As seen in FIG. 4, the system also includes an additional highway H11 which is dedicated to the conference function. Thus, the conference port processor 60 appears to the system similarly to any one of the port groups 50–59. In the system, a conventional 64 KB/S data rate is provided for each port so that when twenty-four channels in each port group are multiplexed and framing bits are added, a highway data rate of 1.544 MB/S results. Each frame consists of 193 bits, the first of which is a framing pulse, followed by twenty-four channels of 8 bit, $\mu=255$ companded PCM data.

Whenever any subject of ports in the overall network are to be in conference, the CPU 21 controls the routing of their signals through the digital switching network 20 to the dedicated 1.544 MHz line going to the digital conference 60, which operates on the incoming data words such that the first four words W0–W3 are combined into a first conference C0, the second group of four words W4–W7 make up the second conference C1, words W8–W11 define the third conference C2, words W12–W15 define the fourth conference C3, and the last eight words W16–W23 are assigned to the fifth conference C4. For simplicity, each eight-bit word position will be hereafter referred to simply as a channel.

Figure 5:
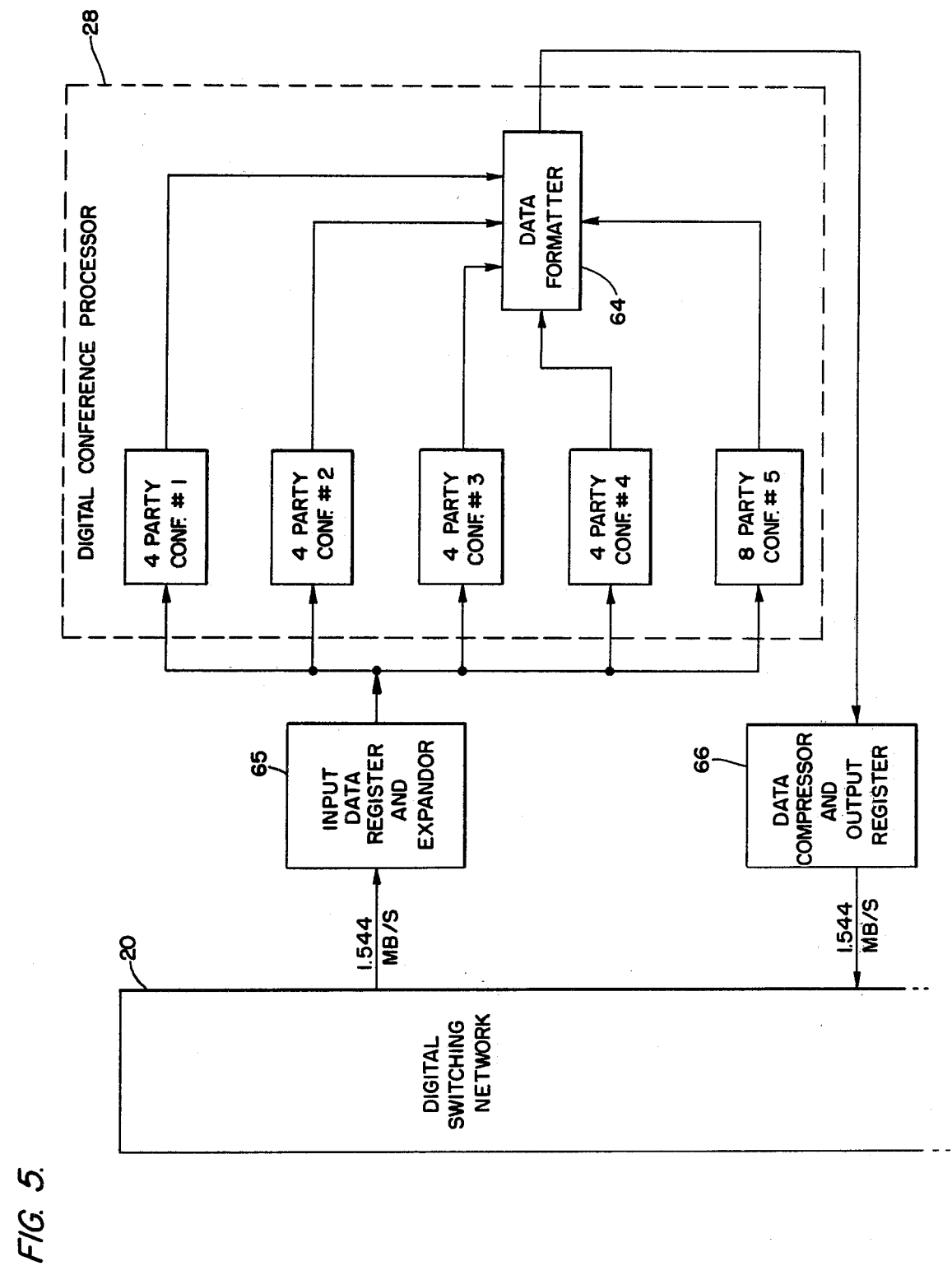
FIG. 5 is a simplified conference diagram of the digital conference in accordance with this invention.

FIG. 5 is a simplified concept diagram of the conference system of the present invention showing that the digital conference processor 28 is functionally capable of providing four 4-party conferences plus one 8-party conference comprising twenty-four total ports. The data on the 1.544 MB/S bus from the digital switching network 20 is applied to an input data register and expandor 65 where the data is expanded prior to processing. The five conference groups depicted in the digital conference processor 28, as illustrated in FIG. 5, are merely concept designations including how the twenty-four channels allocated to the conference circuit may be divided from an operating point of view to provide conferences of different sizes. In actual fact, the digital conference processor 28 does not include hardware subdivided into five conference circuits but merely operates on the twenty-four channels in groups as depicted in FIG. 5. This processing is performed by the data formatter 64 which provides the conference signals in serial form to a data compressor and output register 66 where the data is compressed once again and applied on the 1.544 MB/S bus to the digital switching network 20 to be returned to the individual conferees. Thus, if a four-party conference is required, the CPU 21 assigns one of the available conferences (one of the four available conference facilities C0–C3) and routes the transmit words from the conferees port through the digital switching network 20 to the corresponding time slot in the multiplex data stream going to the digital conference circuit. At the same time other conferences could be simultaneously taking place using the other available channels of the conference circuit.

Figure 6:
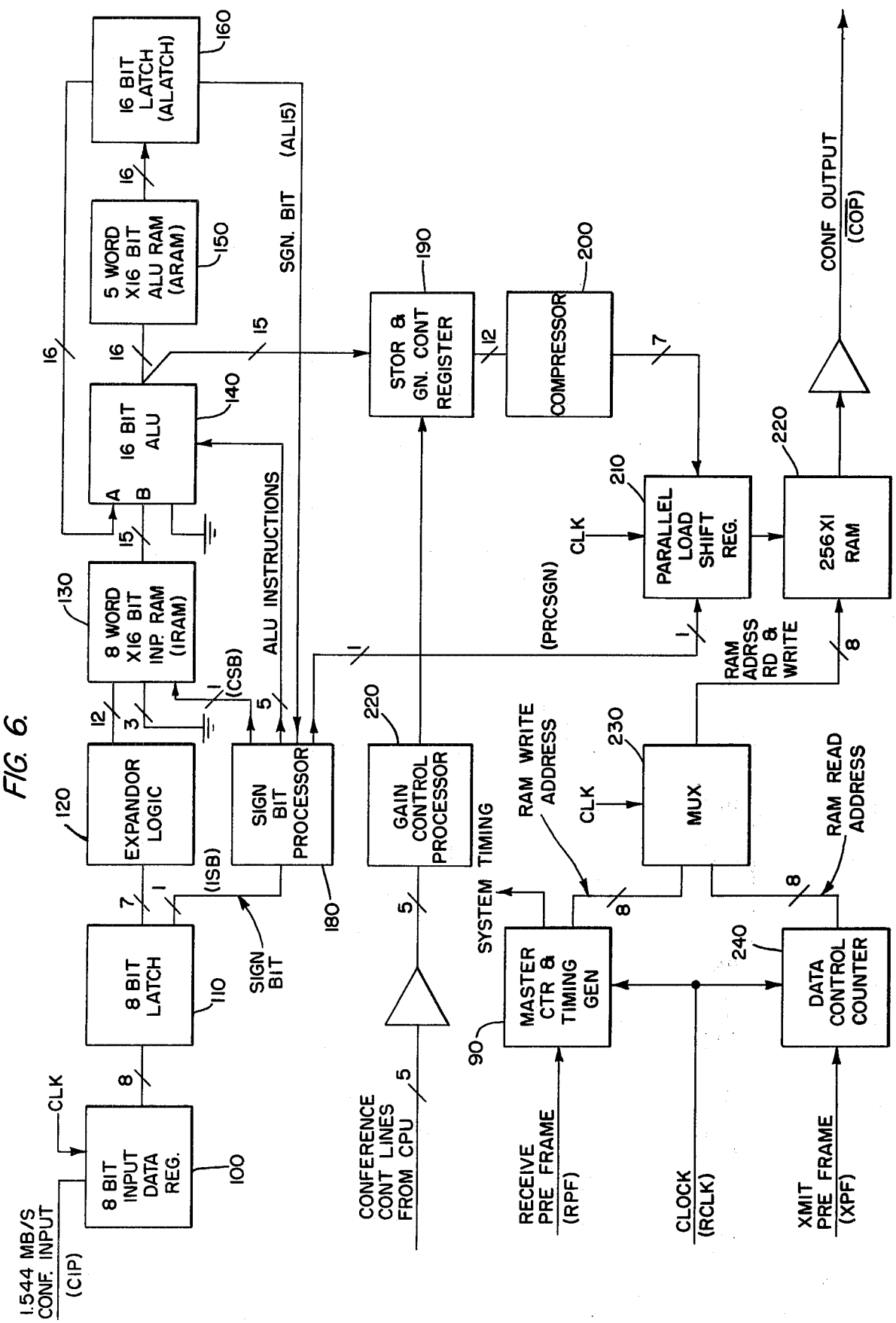
FIG. 6 is a schematic block diagram of a preferred embodiment of the digital conference circuit of this invention.

FIG. 6 is a basic block diagram of the digital conference circuit in accordance with the present invention. The basic function of this circuit is to provide for the simultaneous operation of four 4-party and one 8-party conferences by operating on eight bit compressed PCM words received from the matrix switch in such a manner that signals are expanded, combined linearly by arithmetic operations, recompressed, and redistributed back to the conferees via the matrix switch. The arithmetic combining operation provides for the deleting of the component of each speaker's voice signal from the data being sent back to that speaker's receiver. In addition, the digital conference is capable of providing for expansion of the basic conference sizes by combining any of the conference groups C0–C4 in pairs. In such expansion of the conference size, one port of each basic conference group is required for linking it to another conference group. Hence, the linking of two 4-party conference groups results in a 6-party conference group, and the linking of a 4-party group and an 8-party group results in a ten party conference. The manner in which this is accomplished will be described in greater detail hereinafter.

Referring to FIG. 6, each of the twenty-four 8-bit words allocated to the digital conference is received sequentially on the serial 1.544 MB/S data line CIP from the digital switching network at an 8-bit input data register 100. The eight bits of each word are received in serial form and shifted into the register 100 in time synchronization with clock signals generated from the master counter 90, which is synchronized to the system timing by the receive preframe signal RPF. As each word is received in the register 100, it is transferred in parallel into an 8-bit latch 110 to permit processing while the next word is received serially and stored in the register 100. Thus, each processor cycle of the digital conference comprises a clock cycle of bits 0–7 which are synchronized with the system clock and occur in time with each successive bit being received in serial form into the data register 100. Thus, once a word has been received and stored in the latch 110, the digital conference system has eight cycles of processing time until the next word will have been completely received in the data register 100 and be ready for shifting into the latch 110. The twenty-four words or channels allocated to the digital conference therefore come in in sequence and each word is processed as the next word is being received in the data register 100.

The master counter 90 is driven from the system clock so as to be synchronous therewith, and is reset by the received preframe signal $\overline{RPF}$ so that it is in synchronism with the data received from the system insofar as the sequential order and timing of the channels is concerned. Thus, the received preframe signal $\overline{RPF}$ which comes in from the common control tells the digital conference that the input switch 100 is about to receive the first bit of the first word of the twenty-four word sequence. The received preframe signal $\overline{RPF}$ comes into the digital conference one and one-half bit times before the frame pulse and serves as a preliminary indication that a new frame is about to occur.

Before each word can be arithmetically processed, it must first be expanded into a thirteen bit linear form. In this regard, each 8-bit word is made up of seven bits representing magnitude and eighth bit representing the sign of the word. Since the sign bit will not be affected in the expanding operation, the first seven bits of the word are applied from the latch 110 through an expandor logic circuit 120 where it is expanded to twelve bits. The sign bit is forwarded from the latch 110 through a sign bit processor 180, which formulates the arithmetic functions to be performed in connection with the word on the basis of the value of this bit. The sign bit is also forwarded from the sign bit processor 180 with the twelve bit expanded word to an input RAM 130 for storage. The arithmetic functions to be performed on the word are effected by an arithmetic and logic unit 140, having a pair of inputs A and B, the B input being connected to the fifteen output of the RAM 130. The purpose of the RAM 130, which has a capacity of eight words, is to store the eight bits of each channel as it is received and retain these bits during processing by the ALU 140 so that when a total is provided by the ALU 140, the individual words of each conferee may be subtracted from the total prior to outputting. Thus, as each word comes into the RAM 130 it is processed by the ALU in accordance with the sign bit designated by the processor 180 to produce a partial total until all the words of a particular conference group have been received.

The processor 180 also provides the manipulation of the sign bit which effectively results in inversion of every other (alternate) channels coming into the digital conference. In this regard, the input data latch 110, which stores the incoming sign bit of each channel provides to the processor 180 not only the stored sign bit, but also an inverted sign bit. Thus, the processor 180 merely selects the stored sign bit for one channel, and then selects the inverted sign bit rather than the stored sign bit for the next channel. This effective inversion of alternate sign bits provides the same result insofar as the digital conference is concerned as if an inverting amplifier had been placed in the analog section of the port associated with that channel.

The partial and total sums of the signals which constitute the different conference groups are stored in the ALU RAM 150, which also provides a work area for storing data which is in the process of being converted from two's complement to sign-magnitude. The partial and the total sums stored in the RAM 150 are supplied through a sixteen bit latch 160 back to the A input of the ALU 140 for processing.

When the total sum of signals which constitute a given conference group has been provided by the ALU, the channels associated with that conference group which are stored in the RAM 130 are then successively subtracted from the total, with the result being provided to a gain control register 190. In the register 190, gain control over the signals is provided by a gain control processor 220, the gain being controlled in 6 db increments by selectively shifting the word one bit to the right to reduce the gain for those conference groups of larger size, such as the eight-party conference and the expanded conference groups. Each word is then once again compressed in the compressor 200 and shifted into a parallel-in serial-out shift register 210 under control of the clock derived from the master counter 90. The register 210 receives the compressed seven bits from the compressor 200 and the sign bit from the sign bit processor 180 and shifts the word into an output RAM 220.

A RAM write address is provided from the master counter and timing generator 90 through a multiplexing circuit 230 which also receives the RAM read address from a data control counter 240. The multiplexing circuit 230 provides the RAM write address to the RAM 220 during the first half of a clock cycle and provides the RAM read address from the data control counter 240, which is synchronized to a transmit preframe signal $\overline{XPF}$ from the system. Thus, the data from the shift register 210 is shifted into the RAM 220 in synchronism with the timing of the digital conference and is then shifted out into the system in serial form onto the 1.544 MB/S serial output line $\overline{COP}$ in synchronism with the data processed by the digital switching network.

Although the synchronizing receive preframe signal $\overline{RPF}$ and transmit preframe signal $\overline{XPF}$ have a known fixed time relationship to one another in the preferred embodiment and are synchronous with the clock signal, it is also possible in accordance with the present invention that the two synchronizing signals not have a fixed time relationship to one another. By providing the separate data control 240 and multiplexing circuit 230, such flexibility is permitted, so long as both synchronizing signals are synchronous with the incoming clock signal.

The timing of the various operations within the digital conference circuit in addition to the relative timing of the various system timing pulses produced by the master counter 90 are illustrated in FIG. 7. All timing signals are derived by selectively gating signals from an eight bit synchronous binary counter which is driven by the basic system clock RCLK and the receive preframe pulse $\overline{RPF}$. From the basic system clock signals RCLK are derived the digital conference timing clock signals $\overline{CLK}$ and CLK for distribution and control over the various circuits within the digital conference.

The details of the digital conference will now be explained in connection with FIGS. 6 through 18. Referring first to FIG. 8, serial input data on the 1.544 MB/S CIP line is received at the input data register 100 and is clocked into the register in time with the input register clock signal IREGCK. When the register 100, which is a serial-in/parallel-out register, has received all eight bits of the incoming word, the contents are shifted into the input data latch 110 which comprises a plurality of flip-flops 111 through 118. The shifting of data from the register 100 to the latch 110 occurs upon receipt of the timing signal $\overline{C}$.

The first seven bits of the word representing the magnitude of the data are applied to the expander 120; while, the eighth bit, which forms the sign bit designating whether the data is positive or negative and which is stored in the flip-flop 118, provides both the sign bit and inverted sign bit on lines ISB and $\overline{\text{ISB}}$ to the sign bit processor illustrated in FIG. 9. The sign bit processor stores in a multiplexer 181 three basic pieces of sign information for generation of appropriate ALU instructions. First of all, it stores the sign of each input data word provided by the signal ISB and the inverted sign provided by signal $\overline{\text{ISB}}$. Secondly, it stores the conditioned sign bit of each input data word in the form of a signal CSB. In this regard, since the sign bit of every other conference channel has been inverted, the CSB signal includes both sign bits and inverted sign bits, to enhance the conference stability, as already described. The third bit of stored information is the sign of the conference data to be transmitted back to each speaker in the form of a signal AL15. The ISB, $\overline{\text{ISB}}$, CSB, and AL15 bits are multiplexed onto a multiplexed sign bit line MXSB via a latch 182 to determine the appropriate instruction to be given to the ALU 140 and to provide the required sign bit during the various clock cycles of each processor cycle.

The multiplexer 181 is driven by the clock signals B, C and D to apply it contents sequentially to the MXSB latch 182. As already indicated, each processor cycle comprises eight clock cycles; however, the multiplexer 181 is stepped once for each two clock cycles, so that for one channel being processed the inputs D0–D3 thereof may be scanned, while for the next channel, the inputs D4–D7 will be scanned. From this, the manner in which the sign bit for every other channel is inverted can be readily seen, the normal sign bit being selected from input D3 of multiplexer 181 during one processor cycle and the inverted sign bit being selected from input D7 during the next processor cycle.

There are only five ALU operations required by the digital conference:
1. A+B
2. A (transfer contents of A to the output)
3. A−B
4. $\overline{\text{A}}$
5. A+1

For this purpose four control signals are required to control the operation of the ALU 140, which signals are ALUS12, ALUS03, ALUM and ALUCN. FIG. 10 is a logic truth table which indicates how the various control signals for the ALU are formed from the various timing control input signals C1, B1, and the signal on MXSB for the various cross cycles of operation. The logic indicated in the truth table of FIG. 10 is performed by the gates 183–187 in FIG. 9 and the timing involved with such operations are clearly indicated in the timing diagram of FIG. 7.

Returning to FIG. 8, the twelve bit expanded word derived from the expander 120 is applied to the input RAM 130 consisting of respective chips 131–134, which store the twelve bits along with the sign bit provided on the multiplex line MXSB from FIG. 9. Each word is written into memory 130 by the input RAM write enable pulse IRWE, and the write and read address lines are controlled by the timing signals D, E, and F which provides a 0–7 address sequence which repeats three times per frame. Thus, the input RAM 130 is capable of storing eight words of data at a time and these words are allocated in the memory on the basis of the applied timing signals in the manner indicated in the table illustrated in FIG. 11. Thus, it will be seen from the description of the operation of this system to be provided hereinafter that when the total signal value for the eight conference group including words 16–23 has been determined, for example word 15 from the input RAM 130 will be read out to the ALU 140 to be subtracted from this total at the beginning of the same cycle that word 0 is shifted into the latch 110. Thus, as the storage area in the RAM 130 for word 16 is no longer needed, the first word of the next conference group is ready to be shifted into the vacated storage location. During the next operating cycle, channel seventeen is transferred out of RAM 130 and channel two is transferred into that vacated memory location. Processing continues sequentially in that manner.

As seen in FIG. 12, the ALU 140 has A inputs AL-0–AL15 derived from the sixteen flip-flops 161–176 of the latch 160. The B inputs ID0–ID15 are derived from the input RAM 130 (FIG. 8). The instructions which the ALU must perform at each step in the machine cycle is determined by the sign bit processor 180, which provides the control signals ALUCN, ALUS12, ALUS03, and ALUM. All input data to the ALU 140 is in sign-magnitude form as received from the expandor logic circuit 120. Since the ALU 140 operates in a two's complement and arithmetic mode, the signs of the input sign magnitude data determines whether the ALU must perform an ADD or SUBTRACT function. After the ALU performs the various operations for determining the basic information to be sent back to each conference participant, this information is available in two's complement form and must be converted back into sign magnitude form before being applied to the compressor circuit 200. Hence, the sign bit of each result provided by the signal AL15 is tested to determine one of two courses of action. If the sign bit is positive, the data is outputted to the gain control register 190 without modification. On the other hand, if the sign bit is negative, a one's complement plus 1 operation is performed to convert to a positive number.

With the limited set of instructions to be performed by the ALU 140, the S0 and S3 control inputs are always identical as are the S1 and S2 inputs to the ALU 140. Hence, the control signal ALUS03 is common to both S0 and S3 and the signal ALUS12 is common to S1 and S2. Various arithmetic, data transfer and clear operations take place within the ALU on each clock cycle, a group of eight clock cycles constituting a complete processor cycle. As already indicated, one processor cycle consists of processing the last input word and also outputting a data word to the gain control register 190.

The ALU output RAM 150 is capable of storing five words of fifteen bits and is addressed by the timing signals on control leads ARAA, ARAB, AND ARAC which are applied to the A, B, and C address inputs of the RAM. The storage assignments are formulated so that memory location 4 is used as a work area during clock cycles 1, 2, 3, and 4 for storing data which is in the process of being converted from two's complement to sign magnitude form, prior to being loaded into the gain control register 190. Memory locations 0, 1, 2, and 3 are time-shared over the course of the twenty-four channel frame to store partial running sums of a given conference group and to also hold the total sum of the previously processed conference groups.

The ALU latch 160 simply provides a temporary storage register to hold the information accessed from the RAM 150 so that it can be inputted to the A input of the ALU 140 for subsequent processing. Data is transferred to the latch 160 by the transfer pulse ALTFR which operates in synchronism with the address presented to the RAM 150, as shown in the timing diagram of FIG. 7. In order to minimize the amount of hardware required in the system, the control signal on line ALCLR which is to perform a CLEAR function, actually drives all of the $\overline{Q}$ outputs to the ALU to their high states and thus present a data value of minus 1 instead of 0 to the ALU input whenever the latch 160 is cleared. Thus, the data being summed up for each conference group is always low by one count. The only effect of this is to cause the conference data being returned to each channel to have a DC offset of one unit. The effect will, of course, have no affect on overall system performance.

The structure and operations which take place at each of the clock cycles contained in a basic data processing cycle are illustrated in the flow chart shown in FIG. 13. This chart gives the sequence of steps for the particular processor cycle where channel 0 data is being shifted to the latch 110 from register 100, and processed data is being outputted to channel 16.

During clock cycle 0, the seven magnitude bits of word 16 and the conditioned sign bit are read from the input RAM 130 and applied on leads ID0-ID15 from location 0 in the input RAM 130 to input B of the ALU 140. As seen from FIG. 11, the input RAM 130 at this time stores words 16-23 in memory locations 0-7 thereof. Next, the total sum of the eight words of conference group member 4 are read from location 3 in the ALU RAM 150 into the latch 160 in response to the transfer signal ALTFR and this total sum value is transferred to the A input of the ALU 140 on leads AL0-AL15.

In clock cycle 1, the inverted conditioned sign bit $\overline{CSB}$ is tested to determine whether it is positive or negative. The inverted sign bit $\overline{CSB}$ is applied to the multiplexer 181 (FIG. 9) which scans its inputs in time with the signals B, C, and D connected to the logic circuitry which determines on the basis of the logic truth depicted in FIG. 10 which instructions are to be performed by the ALU 140. If the sign bit $\overline{CSB}$ for word 16 is positive, the ALU 140 will execute an A-B operation. If the sign bit $\overline{CSB-16}$ is found to be negative, the ALU 140 will execute an A+B operation. The result, which is a two's complement of the conference data for channel 16, is then stored in location 4 of the ALU RAM 150.

During clock cycle 2, location 4 of the ALU RAM 150 is read and the contents transferred through the latch 160 to input A of the ALU 140. The sign bit AL15 derived from flip-flop 176 from the latch 160 is also stored in the sign bit processor 180 (FIG. 9) at this time.

During clock cycle 3, the sign bit AL15 is tested in the sign bit processor 180 to determine whether it is positive or negative. If the sign bit AL15 is positive, the data at input A of the ALU word 40 is transferred to the output thereof without modification and is stored in location 4 of the ALU RAM 150. If the sign bit AL15 is negative, a one's complement of the word at input A of the ALU 140 is performed and the result is then stored in location 4 of the ALU RAM 150.

During clock cycle 4, location 4 of the ALU RAM 150 is read and transferred to the A input of the ALU 140 through the latch 160. During clock cycle 5, the data at input A of the ALU is transferred directly out to the gain control register 190 without modification if the sign bit AL16 was positive; however, if the sign bit was negative, the ALU 140 performs an A+1 operation of the data prior to transfer to the gain control register 190.

At this point, word 16 has been transferred out of location zero in the RAM 130 to make room for the incoming data from the next conference group. Thus, during clock cycle 6, the input sign bit ISB of incoming word zero is forwarded to the sign bit processor 180 and the seven magnitude bits of word zero are stored in location 4 of the input RAM 130 along with the sign bit on lead MXSB. During the same cycle, the partial sum of word 0 from location 4 of the ALU RAM 150 is transferred through the latch 160 to the A input of the ALU 140. In this case, since we are working with the first word of the conference group, there is no partial sum in the RAM 150, but for subsequent words, a partial sum will be forwarded to the A input of the ALU 140 and then arithmetically processed with the next word.

During clock cycle 7, word 0 is read from the input RAM 130 to become input B to the ALU 140. Also, the sign bit ISB is tested to determine whether it is positive or negative. If the sign bit is positive, the sign bit processor 180 will control the ALU to execute an A+B operation. On the other hand, if the sign bit ISB is negative, the ALU 140 will be controlled to execute an A-B operation. The result of this arithmetic operation is then stored in location 0 of the ALU RAM 150 and becomes the partial sum of the conference group 0.

The same functions are repeated for the following processor cycle in which channel 17 is outputted and channel 1 is inputted. The cycle continues in this manner outputting one channel and inputting the next channel.

Each channel outputted from the ALU 140 is applied to the gain control register 190 where it may be operated on under control of the gain control processor 220. Since the digital conference is capable of combining conference groups to form an expanded conference facility, the gain of each channel must be controlled in accordance with the size of the conference facility. If a simple four-party conference utilizing one of the available conference groups is selected, the channels of data supplied to the register 190 may be merely stored without modifying the gain thereof; however, for expanded conference facilities including the 8-party conference group, the gain must be appropriately adjusted in the register 190 under control of the gain control processor 220.

Referring to FIG. 14, after the computations have been completed in the arithmetic logic unit 140, the fifteen magnitude bits are parallel loaded from the ALU into the gain control register 190, which comprises individual registers 191-194. The loading of data into the gain control register 190 is effected in response to the gain control register clock signal GREGCK and the function performed by the gain control register is determined by the control signal GREGSI, which is applied to the SI inputs of each of the registers 191-194. The GREGSI control signals determine whether the GREGCK clock signals load data or shift data in the registers 191-194. This is clearly indicated in the timing diagram in FIG. 7.

Assuming that there are no conferences which are expanded (linked to other conferences to increase their size) none of the data being transmitted to the conferees in the four 4-party conferences will be attenuated. Therefore, the binary data corresponding to words 0 through 15 will not be shifted after they are individually loaded into the gain control register 190. Hence, for those words under the conditions of no conference expansion, the gain control register 190 acts simply as a temporary storage register. For words 16 through 23, which are associated with the eight-party conference, the gain control register 190 will first be loaded upon receipt of a gain control clock signal GREGCK at the time the signal GREGSI is high. Then, the data in the registers 191–194 will be shifted one bit to the right by having a GREGCK clock signal present when the GREGSI control is low. The shifting of the words in the gain control register 190 one bit to the right provides for adjustment of the gain of the signal.

The resultant data words represent the linear fifteen bit binary weighted words to be transmitted back to the individual conferees, after they are compressed. Compression is performed in the compressor 200 connected to the output of the register 191–194.

As already indicated, the loading of the registers 191–194 and any shifting of data in the registers is controlled on the basis of the values of the gain control clock signals GREGCK and the shift signals GREGSI. The shift signal GREGSI is derived from the timing signal C generated by the system clock, and merely provides for loading of data into the gain control register 190 during the first four bit times and the possible shifting of data in the register during the last four bit times of a processor cycle. The gain clock signals GREGCK are generated in dependence upon various conditions, as determined by the gain control processor 220, illustrated in detail in FIG. 15.

As seen in FIG. 7, when GREGSI is high, the presence of GREGCK simply loads new data into the gain control register 190. During the second half of each word cycle, the GREGSI control lead is low, and a GREGCK clock signal appears only if the contents of the gain control register belong to the eight-party conference, or to a four-party conference which is interconnected to some other conference. Conference expansion is controlled by the central processing unit which indicates to the gain control processor 220 on leads C0EX–C4EX, which are connected to the input of a multiplexer 221. A control circuit 224 is responsive to the clock timing signals F, G, and H for scanning the inputs C0EX–C4EX of the multiplexer 221 providing an output through gate 222 to a multiplexer 223 indicating whether the conference groups associated with the respective inputs are to be interconnected to some other conference group in an expanded conference facility. The control circuit 224 also provides an output via gate 225 to the multiplexer 223 indicating whether the conference group being scanned forms part of a four-party group or relates to the eight-party conference group. A third input to the multiplexer 223 is provided from gain control line GCTRL, which if left open will control the gain of the gain control register 190 to provide a high gain, or may be wired to ground in order to provide a low gain for the gain control register 190. In the high gain mode, all four-party conference circuits contain zero db loss; whereas, the eight-party conference contains six db of loss. These values become 6 db and 12 db, respectively, for the selection of the low gain mode.

The scanning of the three inputs A, B, and C of the multiplexer 223 are controlled by the timing signals from the system clock applied via gates 226 and 227. Thus, at each step of the word bit times a gain control pulse may be provided on the lead GCPUL to the gate 229 depending upon the values provided at the inputs A, B, and C of the multiplexer 223. The shift signal PREGSI is generated at the output of gate 228 from the timing signals A, B, and C.

One additional factor must be considered in evaluating the presence or absence of a condition requiring a shift pulse on the GREGCK lead is that whenever two conferences are interconnected, the channel or word slot which serves as the connecting link is always the highest channel number of a particular conference group. This means that only channels numbers 3, 7, 11, 15, and 23 are valid interconnecting links. Whenever two conferences are connected via these links, the logic ensure that no shift pulses (gain reduction) takes place in these time slots. Hence, for example, if conference groups 0 and 1 are linked together (using word time slots 3 and 7 as interconnecting links), words 0, 1, 2, 4, 5, and 6 which are being sent back to their corresponding conferees would undergo a 6 db attenuation caused by the gain control shift pulses on lead GREGCK, but words 3 and 7 would merely serve to send composite data from one conference group to the other would not get attenuated. This is effected by application of an inhibit signal on lead BLG to the input of gate 222, which inhibits the gate and prevents the generation of an output from the multiplexer 223 through gate 229 on the lead GREGCK.

FIG. 16 provides a table indicating the various signals provided on the lead GCTRL, the expansion control leads C0EX–C4EX and lead BLG, and the resultant number of gain control pulses provided from the output of multiplexer 223 for four-party and eight-party groups, respectively. The operation of the gain control processor 220 can be easily determined from the values provided in FIG. 16 and the waveforms indicated in FIG. 7. It will be noted that a load pulse is generated on lead DLTFR in FIG. 15 to the input of gate 229 from the master clock 90 to provide for loading of each word from the ALU 140 into the gain control register 190. Whether or not an additional clock pulse will be generated on GREGCK then is determined on the basis of the output from the multiplexer 223 on lead GCPUL to the gate 229. Thus, if a channel forms part of an expanded group, the multiplexer 223 will provide an output to produce a gain shift. The output of gate 225 for the eight-party group also automatically produces a gain shift from the output of the multiplexer 223, and depending upon the state of the gain control line GCTRL, the multiplexer 223 may also provide an output pulse to determine the gain control mode.

Referring once again to FIG. 14, after the loading and possible shifting operations in the gain control register 190 are completed for each word, the twelve most significant bits stored in the registers 191–194 are applied to the compressor 200 which operates on twelve parallel lines to produce a compressed seven-bit word. The compressed word, along with the proper sign bit are parallel loaded into the parallel load shift register 210 by the clock pulse $\overline{CLK}$ which occurs when the PREGSI control line is high. This occurs once every eight positive transitions of the clock pulse CLK. The other seven positive transitions of the clock signals which occur when the PREGSI control line is low cause the resulting data in the register 210 to be shifted out to the RAM 220. Once each frame, at the time of the RPF preframe signal, the register 210 is inhibited from shifting by applying this preframe signal to the SO control line of the registers 211 and 212, which make up the shift register 210. This is necessary to properly synchronize the register 210 to the master counter which is stalled once per frame time at the time of arrival of the received preframe signal. The register 210 is a parallel-in/serial-out register which shifts the data on output lead PREGDO to the RAM 220.

The serial data on the PREGDO output of the shift register 210 contains twenty-four channels of eight-bit compressed words, clocked out at a 1.544 MB/S rate, which must eventually be routed back to the receivers of each conferee via the digital switching network. The purpose of the RAM 220, data control counter 240, and multiplexer 230 as seen in FIG. 6 is to synchronize this data with the transmit preframe pulse $\overline{XPF}$ which defines the frame time of all data which is to be injected into the digital switching network. The actual transmit preframe time $\overline{XPF}$ is fixed relative to the received preframe time $\overline{RPF}$; however, as already indicated, this is not a requirement of the present invention and the two preframe time signals could be received at various different times to properly control operation of the digital conference.

Referring to FIG. 17, the outputting of data from the digital conference is accomplished by writing the data on lead PREGDO into the RAM 220 via the PREG output flip-flop 244 in time with the system clock signal CLK. Each serial bit is for convenience written into the RAM location determined by the state of the master counter 90, which applies timing signals on leads A-H through multiplexer 230 comprising stages 231-238, to the RAM 220 during the first half of each bit time by means of the narrow 80 ns write pulse CK3 which is supplied by the master clock. During the second half of the bit time, the RAM 220 is addressed by the data control counter 240, comprising counter stages 241 and 242. This allows data in the RAM 220 to be read out to the output flip-flop 221 to generate the serial data stream on lead $\overline{COP}$ to the digital switching network.

The addresses provided by the data control counter 240 for this read operation are synchronized to the transmit preframe pulse $\overline{XPF}$. Whenever the transmit preframe pulse $\overline{XPF}$ is inputted to the digital conference, it causes the data control counter 240 to be loaded to the count designating the first address in the RAM 220. This thus ensures that the first bit of data which is accessed is bit 1 of channel 0, providing the desired synchronization of the data sent to the digital switching network.

As already indicated, in producing an expanded conference facility by combining conference groups, one channel of each conference group is used as a link between the conference groups, and therefore is lost as a possible conferee channel. Thus, if two 4-party conference groups are combined to form an expanded conference facility, six conferees may be accommodated with one channel in each four-party conference being allocated to the link between the groups. The reason why this is necessary in the manner in which such expansion operates may be seen more particularly in connection with FIG. 18.

Assume that the two 4-party groups comprising channels 0-3 and 4-7 are to be combined in an expanded conference facility to provide a conference between parties A through F. The central processing unit in setting up such a conference will assign the parties A, B, and C to channels 0, 1, and 2, respectively, while, leaving channel 3 blank. Channels 4, 5, and 6 will then be assigned to parties D, E, and F, respectively, and channel 7 will be left blank.

Under these circumstances, the digital conference will produce as an output from the channel 3 the sum of the contributions of channels 0-3 less the contribution of channel 3 itself. Thus, the output from channel 3 will represent a sample of the data from parties A+B+C. The central processing unit will then supply the output from channel 3 directly to channel 7 through the digital switching network. Thus, channel 4 will provide an output corresponding to the sum of channels 4-6 less the contribution of channel 4; namely, E+F from channels 5 and 6 and A+B+C from channel 7. Party D thus receives the contribution from the other five conferees.

On the other hand, the output from channel 7 will correspond to the sum of channels 4-7 less the contribution of channel 7; namely, D+E+F. The central processing unit directly connects the output from channel 7 through the digital switching network to the input of channel 3. Thus, channel 0 will provide an output corresponding to the sum of channels 0-3 less its own contribution; namely, B+C from channels 1 and 2 and D+E+F from channel 3. In this way, with the interlinking of the two 4-party conference groups using channels 3 and 7, each of the six parties in the conference will receive the contribution from the other five parties, and in effect, the two 4-party conference groups have been cross-connected to form a six-party conference.

As seen from the foregoing disclosure, the present invention provides an improved digital conference circuit having greater stability in the establishment of conference connections of different sizes with appropriate gain control in dependence upon conference size.

While I have shown and described one embodiment in accordance with the present invention, it is understood that the same is not limited thereto but is susceptible of numerous changes and modifications as are known to a person skilled in the art, and I therefore do not wish to be limited to the details shown and described herein but intend to cover all such changes and modifications as are obvious to one of ordinary skill in the art.

What is claimed is:

1. A method of combining telephone channels into a conference connection comprising sampling the data in each telephone channel to produce a subscriber signal for each channel, inverting the subscriber signal in at least one but not all of said telephone channels, summing the subscriber signals from each telephone channel including the inverted subscriber signals, successively subtracting from the sum of the subscriber signals the signal derived from each telephone channel to provide individual conference signals, and supplying said individual conference signals to each telephone channel, said step of sampling the data in each telephone channel including converting the sample into a digital word comprising a plurality of bits designating the magnitude of the sample and at least one bit designating the sign thereof.

2. The method as defined in claim 1 wherein said step of inverting comprises manipulating said sign bit to indicate the opposite polarity.

3. A conference circuit for use in a PABX telephone system comprising a series of N input lines, each receiving a subscriber signal from a respective subscriber circuit, summing means connected to each input line of said series for summing said subscriber signals, a corresponding series of subtracting means each having one input connected to the output of said summing means and a second input connected to the corresponding input line for producing respective conference signals, a corresponding series of N output lines each connected to the output of the corresponding subtracting means, and a set of inverting means equal in number to approximately one-half of N and operative to invert the conference signal supplied to alternate output lines of the series of N output lines.

4. A conference circuit as defined in claim 3 wherein said subtracting means comprise differential amplifiers.

5. In a PABX telephone system including a plurality of subscriber circuits, a switching system including a plurality of individual hybrid networks for connecting said subscriber circuits to said switching system along divided transmit-receive paths, said switching system being of the type in which signals are switched in the form of a plurality of subscriber transmit sequential channels which respectively communicate an individual subscriber transmit path voice data signal and a plurality of corresponding subscriber receive sequential channels which respectively communicate an individual subscriber receive path voice data signal, and a common control for controlling said switching system to interconnect selected subscriber circuits, a conference circuit operatively connected to said switching system for establishing a conference connection among three or more subscriber circuits, said conference circuit comprising means for producing subscriber conference data signals for the respective selected subscriber circuits including a means for summing all the subscriber transmit path voice data signals of the subscriber circuits in the conference connection to produce a total conference voice data signal and for successively subtracting from the total conference voice data signal all the individual subscriber transmit path voice data signals of the various subscriber circuits in the conference connection to produce said subscriber conference data signals as a succession of different signals, and inverting means for inverting the polarity of the data signal in at least one but less than all of the subscriber couplets of transmit and receive sequential channels.

6. A conference circuit as defined in claim 5 wherein said inverting means is operative to perform an inversion of at least one but not all of the subscriber conference data signals.

7. A conference circuit as defined in claim 5 wherein said inverting means is operative to perform an inversion of at least one but not all of the subscriber transmit path voice data signals.

8. A conference circuit as defined in claim 5 wherein the successive subtraction of individual subscriber transmit path voice data signals from the total conference voice data signal is performed by a plurality of individual subtracting circuits each having one input for receiving the total conference voice data signal and a second input for receiving the individual subscriber transmit path voice data signal.

9. A conference circuit as defined in claim 8 wherein said inverting means is operative to invert the output of at least one but less than all of said subtracting circuits.

10. A conference circuit as defined in claim 8 wherein an inverting circuit is connected to the output of the subtracting circuits which perform subtraction of alternate ones of the successively subtracted subscriber transmit path voice data signals.

11. A conference circuit as defined in claim 5 wherein each individual subscriber transmit path voice data signal and each individual subscriber receive path voice data signal comprises a digital word including a plurality of bits designating magnitude and at least one sign bit, said inverting means comprising sign bit processor means for inverting the sign bit of digital words in at least one but not less than all of said subscriber couplets of transmit and receive and sequential channels.

12. A conference circuit as defined in claim 11 wherein said subscriber couplets of transmit and receive sequential channels comprise a series of N subscriber couplets, said sign bit processor means including multiplexing means for inverting the sign bit of alternate subscriber couplets of said series.

13. A conference circuit as defined in claim 11 wherein said means for producing subscriber conference data signals includes input data register means for receiving the successive subscriber transmit path voice data signals from said switching system and a first random access memory connected to said input data register means for storing the respective subscriber transmit voice path data signals as at least one group of such data signals.

14. A conference circuit as defined in claim 13 wherein said means for producing subscriber conference data signals includes an arithmetic logic unit having one input connected to the output of said first random access memory, a second random access memory connected to the output of said arithmetic logic unit for storing partial sums, and means for connecting said second random access memory to a second input of said arithmetic logic unit.

15. A conference circuit as defined in claim 14 wherein said sign bit processor means includes means responsive to a sign bit of each subscriber couplet of transmit and receive sequential channels and a plurality of timing signals for controlling the operation of said arithmetic logic unit.

16. In a PABX telephone system including a plurality of subscriber circuits, a switching system, and common control means for controlling said switching system to interconnect selected subscriber circuits, said subscriber circuits each being of the type having associated therewith a hybrid network for connecting the subscriber circuit to said switching system along divided transmit-receive paths, said switching system being of the type in which signals are switched in the form of a plurality of subscriber transmit sequential channels which respectively communicate individual subscriber receive path voice data signals, a conference circuit connected to said switching system by way of a plurality of conference connection group input-output data highways for establishing one or more conference connections each including three or more subscriber circuits, said conference circuit comprising a first random access memory having a capacity for storing a predetermined number of said subscriber transmit path voice data signals, master counter means responsive to a clock signal from said common control means for producing a plurality of clock signals, arithmetic means responsive to said clock signals for summing subscriber transmit path voice data signals in each conference connection group corresponding to the subscriber circuits served by a respective conference connection group input-output data highway to produce group total conference voice data signals for the respective conference connection groups and for successively subtracting from the respective group total conference voice data signals the individual subscriber transmit path voice data signals of the associated conference connection group to produce the individual subscriber receive path voice data signals of the respective conference connection groups, and means for transmitting the individual subscriber receive path voice data signals sequentially to said switching system on the respective data highway corresponding to the conference group.

17. A conference circuit as defined in claim 16 wherein said subscriber transmit sequential channels and said subscriber receive sequential channels comprise subscriber couplets of transmit and receive sequential channels, and at least one of said conference connection groups comprises an associated number of said subscriber couplets different from the number of said subscriber couplets which the other conference connection groups are comprised of.

18. A conference circuit as defined in claim 16 wherein said subscriber transmit sequential channels and said subscriber receive sequential channels comprise couplets of transmit and receive sequential channels and one of said conference connection groups comprises a number of said subscriber couplets for communicating voice data signals which corresponds to the capacity of said first random access memory.

19. A conference circuit as defined in claim 18 wherein a plurality of said conference connection groups comprises a number of said subscriber couplets for communicating voice signals which corresponds to an integral factor of the capacity of said random access memory.

20. A conference circuit as defined in claim 16 wherein said arithmetic means comprises an arithmetic logic unit having one input connected to the output of said first random access memory, a second random access memory connected to the output of said arithmetic logic unit for storing partial sums, and means for connecting said second random access memory to a second input of said arithmetic logic unit.

21. A conference circuit as defined in claim 20 wherein each individual subscriber transmit path voice data signal and each individual subscriber receive path voice data signal comprises a digital word including a plurality of bits designating magnitude and at least one sign bit, and wherein said conference circuit includes input data register means for receiving the subscriber transmit path voice data signals and sign bit processor means responsive to said sign bit of each subscriber transmit path voice data signal and said clock signals for controlling the operation of said arithmetic-logic unit.

22. A conference circuit as defined in claim 21 wherein said sign bit processor means includes inverting means for inverting the sign bit in selected subscriber transmit path voice data signals.

23. A conference circuit as defined in claim 21 wherein said subscriber transmit sequential channels and said subscriber receive sequential channels comprise a series of N subscriber couplets of transmit and receive sequential channels, said sign bit processor means includes inverting means for inverting the sign bit in alternate subscriber couplets of said series of N subscriber couplets.

24. A conference circuit as defined in claim 17 wherein said means for transmitting includes gain control means responsive to said clock signals for controlling the gain of each couplet of transmit and receive sequential channels of a conference connection group in accordance with the number of subscriber couplets in the group with which it is associated.

25. A conference circuit as defined in claim 24 wherein said gain control means includes gain control register means for storing the individual subscriber transmit path voice data signals of each conference connection group received from said arithmetic means and gain control processor means responsive to said timing signals for shifting the subscriber receive path voice data signals of selected conference connection groups in said gain control register means to adjust the gain thereof.

26. A conference circuit as defined in claim 25 wherein said conference circuit includes inverting means for inverting the data signals of selected subscriber couplets of transmit and receive sequential channels.

27. A conference circuit as defined in claim 26 wherein each individual subscriber transmit path voice data signal and each individual subscriber receive path voice data signal comprises a digital word including a plurality of bits designating magnitude and at least one sign bit, said inverting means comprising sign bit processor means for inverting the sign bit of at least one but not all of said subscriber couplets of sequential transmit and receive channels.

28. A conference circuit as defined in claim 27 wherein said transmit and receive sequential channels comprise a series of N subscriber couplets of transmit and receive sequential channels, said sign bit processor means including multiplexing means for inverting the sign bit of alternate subscriber couplets of said series of N subscriber couplets.

29. A conference circuit as defined in claim 25 wherein said gain control processor means includes inhibiting means responsive to said clock signals and said common control means for inhibiting gain control for the subscriber receive path voice data signals of one conference connection group in each of two adjacent conference connection groups.

30. A conference circuit as defined in claim 16 wherein said means for transmitting includes a third random access memory, means for applying said group conference channels successively to said third random access memory, data control counter means driven by a clock signal from said common control means for producing sequential read address signals for controlling the reading of data from said third random access memory.

31. A conference circuit as defined in claim 30 wherein said master counter means produces sequential write address signals for controlling the writing of data into said third random access memory.

32. A conference circuit as defined in claim 31 wherein said means for transmitting further includes multiplexing means responsive to said clock signals from said master counter means for alternately applying said write address signals and said read address signals to said third random access memory during successive clock periods.

33. A conference circuit as defined in claim 32 wherein said master counter means is synchronized periodically by a receive preframe signal from said common control means and said data control counter means is synchronized periodically by a transmit preframe signal from said common control means.

34. In a method of establishing a conference connection between a plurality of telephone subscribers including the steps of summing the signals received from each telephone subscriber to produce a total conference signal, subtracting from said total conference signal the individual subscriber signals to produce a plurality of subscriber conference signals, and returning to each telephone subscriber the subscriber conference signal not including the subscriber's contribution to the total signal, the improvement comprising inverting the signal from at least one of said subscribers prior to summing said subscriber signals, said signals received from each telephone subscriber being digital signals including a plurality of bits designating magnitude and at least one sign bit, said step of inverting a subscriber signal comprising changing the sign bit thereof to designate the opposite polarity.

35. A method of combining a series of N telephone channels into a conference connection comprising sampling the data in each telephone channel, storing the sampled data, summing the stored data, successively subtracting from the sum of the stored data the stored sample from each channel to provide a corresponding series of N conference signals, and inverting alternate of said series of N conference signals.

* * * * *